A. KERTÉSZ.
COMBINED LIFTING JACK AND BRAKE MECHANISM FOR AUTOMOBILES.
APPLICATION FILED JAN. 10, 1912.
1,029,301.
Patented June 11, 1912.
2 SHEETS—SHEET 1.
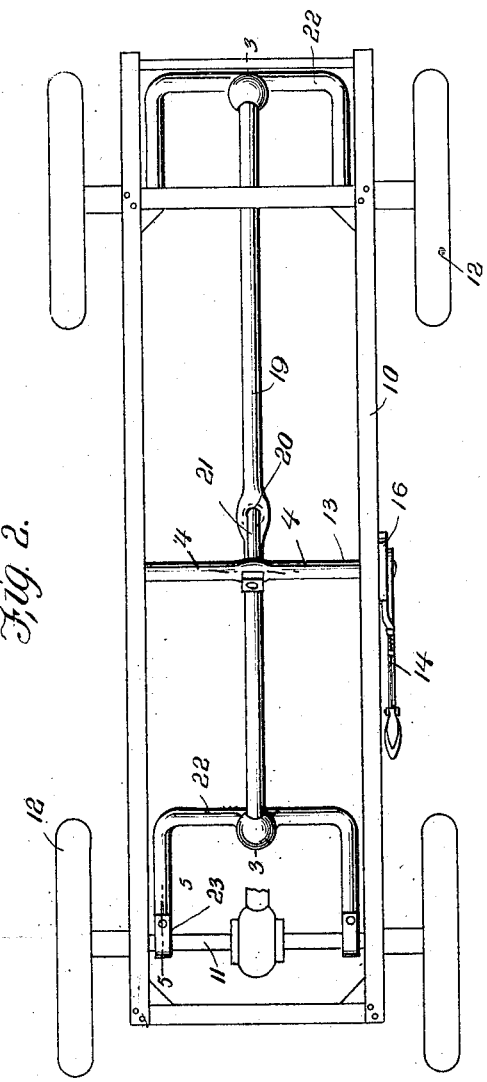
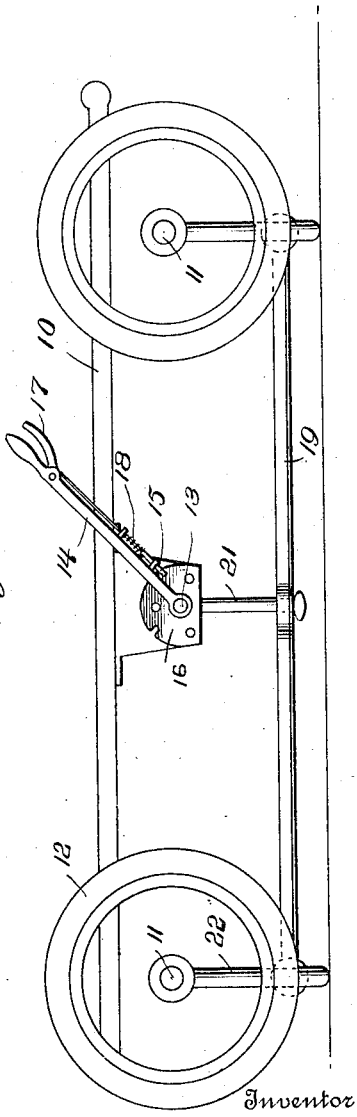
Inventor
Alexander Kertész.
Witnesses
William R. Smith
By Victor J. Evans
Attorney A. KERTÉSZ.
COMBINED LIFTING JACK AND BRAKE MECHANISM FOR AUTOMOBILES.
APPLICATION FILED JAN. 10, 1912.
1,029,301.
Patented June 11, 1912.
2 SHEETS—SHEET 2.
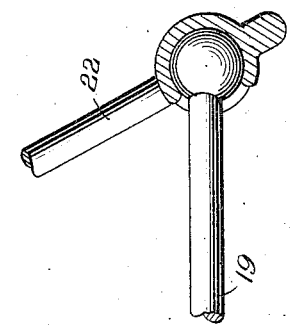
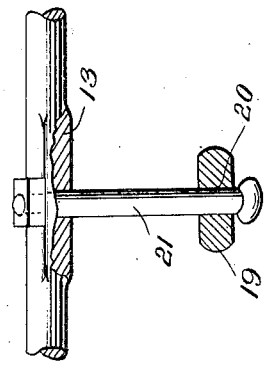
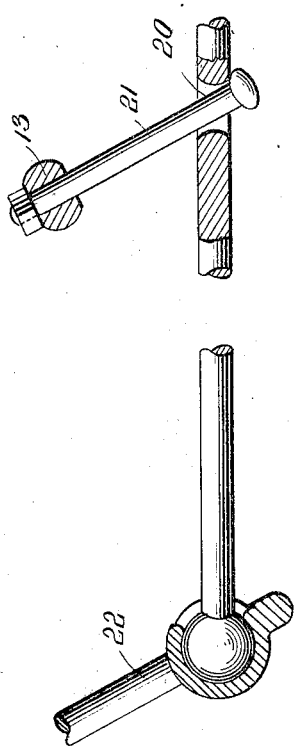
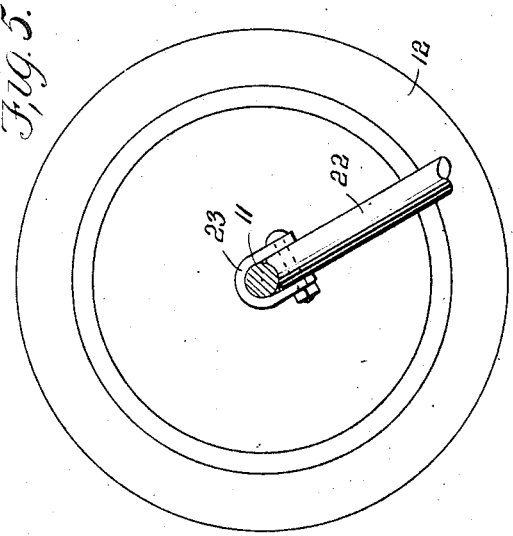
Inventor
Alexander Kertész.
Witnesses
William P. Smith.
F. H. Hoster
By Victor J. Evans
Attorney

UNITED STATES PATENT OFFICE.

ALEX KERTÉSZ, OF NEWARK, NEW JERSEY.

COMBINED LIFTING-JACK AND BRAKE MECHANISM FOR AUTOMOBILES.

1,029,301.   Specification of Letters Patent.   Patented June 11, 1912.

Application filed January 10, 1912. Serial No. 670,487.

*To all whom it may concern:*

Be it known that I, ALEX KERTÉSZ, a citizen of the United States, residing at Newark, in the county of Essex and State of New Jersey, have invented new and useful Improvements in Combined Lifting-Jacks and Brake Mechanism for Automobiles, of which the following is a specification.

An object of the invention is to provide a combined lifting jack and brake mechanism for automobiles, whereby the wheels of the automobile can be raised from the ground when it is desired to make repairs and whereby the momentum of the automobile can be checked.

My invention embodies among other features, a manually operable device for checking the speed of a vehicle to avoid an accident, the said device being operable more particularly as a jack to raise the vehicle from the ground for the purpose of enabling the operator to easily gain access to various parts of the automobile for the purpose of repairing or adjusting the same. For the purpose mentioned, use is made of an operating bar journaled on the frame of a vehicle and extending transversely thereto, an operating lever keyed to the operating bar, a slotted main bar having a bolt extended through the slot thereof and secured to the operating bar and U-shaped lifting members mounted to swing on the axles of the vehicle and pivotally connected to the ends of the main bar, the said lifting members being movable to raise the wheels of the vehicle from the ground and when in normal position, being spaced from the ground.

Reference is to be had to the accompanying drawings constituting a part of this specification, in which similar characters of reference denote corresponding parts in all the views, and in which—

Figure 1 is a side elevation of an automobile frame showing my device applied thereto and in operative position. Fig. 2 is a plan view of the frame of an automobile showing my device applied thereto and in normal or inoperative position. Fig. 3 is a vertical longitudinal sectional view taken on the line 3—3 in Fig. 2. Fig. 4 is a vertical transverse sectional view taken on the line 4—4 in Fig. 2, and Fig. 5 is a vertical sectional view taken on the line 5—5 in Fig. 2.

Referring more particularly to the views, I provide a frame 10, provided with the usual axles 11 having wheels 12 revolubly mounted thereon. Extending transversely to the frame 10 and journaled thereon at approximately a central portion of the frame is an operating shaft 13 having keyed to one end thereof an operating lever 14, provided with a pawl 15 adapted to operate over a rack 16 and movable by means of a lever 17 provided with a spring 18, the mentioned pawl and rack mechanism being adapted for locking the shaft 13 in various positions.

A main bar 19 is mounted to extend longitudinally to the frame 10 and is provided at a medial portion thereof with a slot 20, the said slot being preferably formed by enlarging a portion of the bar 19. Extended through the slot 20 is a bolt 21, the said bolt being loosely movable in the slot 20 and having one end thereof threadedly secured to the shaft 13. The ends of the main bar 19 are pivotally connected with U-shaped lifting members 22, mounted to swing on the axles 11 by means of suitable collars 23, mounted to loosely encircle the axles and having connection with the ends of the members 22.

Now assuming that my device is in initial position as shown in Fig. 2, and that the vehicle is moving over a road, if it is desired to suddenly check the momentum of the vehicle, the operating lever 14 is actuated to rotate the operating shaft 13, thus moving the main bar 19 to swing the lifting members 22 downwardly and into engagement with the ground, the length of the said lifting members, from the axles 11 being slightly greater than the radii of the wheels 12, so that when the lifting members 22 engage the ground, the wheels 12 will be slightly raised therefrom and the lifting members acting as drags will check the momentum of the vehicle, the lowered position of the lifting members being shown in Fig. 1. By returning the lever 14 to normal position, the lifting members will be disengaged from the ground, thus permitting the wheels 12 to reassume their normal position on the ground as will be readily understood.

My device is more particularly adapted for use as a lifting jack and if it is desired to make certain repairs beneath the vehicle or on the tires of the wheels 12 when the operating lever 14 is actuated to engage the lifting members 22 with the ground, the wheels 12 will be raised from the ground, as will also the body of the car, thus permitting the operator to easily gain access to the parts beneath the automobile for the purpose of repairing the same and the wheels 12, disengaged from the ground will be free to rotate, thus enabling the operator to change the tires on the wheels or perform other duties that may be necessary, it being understood that the vehicle can be easily and quickly raised from the ground and supported by the lifting jack when the vehicle is first set in motion in order to give sufficient momentum to the vehicle to raise the same from the ground when the jack is moved into lowered and supporting position.

I claim:—

In combination with a vehicle frame, an operating shaft journaled on the said frame and extending transversely thereto, a main bar extending longitudinally to the said frame and provided with a slot, a bolt loosely extended through the said slot and secured to the said operating shaft, U-shaped lifting members mounted to swing on the axles of the vehicle and pivotally connected to the ends of the said main bar and an operating lever keyed to the said operating shaft for rotating the same to actuate the said main bar and move the said lifting members into lifting position.

In testimony whereof I affix my signature in presence of two witnesses.

ALEX KERTÉSZ.

Witnesses:
EMIL GERMANUS,
ABRAHAM WULACH.